US009311379B2

(12) United States Patent
Hursh et al.

(10) Patent No.: US 9,311,379 B2
(45) Date of Patent: Apr. 12, 2016

(54) UTILIZATION OF DATA STRUCTURES TO SYNCHRONIZE COPIES OF A RESOURCE

(71) Applicant: International Business Machines Corporation, Armonk, NY (US)

(72) Inventors: Daniel M. Hursh, St. Charles, MN (US); Paul E. Movall, Rochester, MN (US); Eric J. Nelson, Rochester, MN (US); Brett J. Reese, Byron, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 13/710,075

(22) Filed: Dec. 10, 2012

(65) Prior Publication Data

US 2014/0164324 A1 Jun. 12, 2014

(51) Int. Cl.
*G06F 17/30* (2006.01)
*G06F 11/20* (2006.01)
*G06F 9/50* (2006.01)

(52) U.S. Cl.
CPC ........ *G06F 17/30578* (2013.01); *G06F 9/5027* (2013.01); *G06F 9/5072* (2013.01); *G06F 11/2094* (2013.01)

(58) Field of Classification Search
CPC .......... G06F 11/2094; G06F 17/30011; G06F 17/30578; G06F 17/30575; G06F 17/30286; G06F 9/5027; G06F 9/5072
USPC .................................................. 707/613, 623
See application file for complete search history.

(56) References Cited

U.S. PATENT DOCUMENTS

| | | | |
|---|---|---|---|
| 7,506,007 B2* | 3/2009 | Bjorner | |
| 8,046,424 B2* | 10/2011 | Novik et al. | 709/216 |
| 2002/0165745 A1* | 11/2002 | Greene et al. | 705/7 |
| 2004/0186916 A1* | 9/2004 | Bjorner | 709/248 |
| 2006/0143350 A1* | 6/2006 | Miloushev et al. | 710/242 |
| 2007/0026373 A1* | 2/2007 | Suriyanarayanan et al. | 434/322 |
| 2007/0168516 A1* | 7/2007 | Liu et al. | 709/226 |
| 2010/0114818 A1* | 5/2010 | Lier et al. | 707/613 |
| 2010/0118895 A1* | 5/2010 | Radulescu | 370/503 |
| 2011/0153840 A1* | 6/2011 | Narayana et al. | 709/227 |

OTHER PUBLICATIONS

"Vector Clock" from Wikipedia, the Free Encyclopedia, viewed Nov. 12, 2012, 3 pp.
"Version vector" from Wikipedia, the Free Encyclopedia, updated Aug. 14, 2012, 2 pp.

* cited by examiner

*Primary Examiner* — Leslie Wong
(74) *Attorney, Agent, or Firm* — Toler Law Group, P.C.

(57) ABSTRACT

A method may receive, at a first node, a first message with a first message data structure from a second node. The first message data structure may include a counter for each resource of a plurality of resources that is indicative of a most current age of a master copy of the resource known by the second node. The first node may include a current data structure with a counter for each resource that is indicative of a most current age of the master copy of the resource known by the first node. The method may determine whether at least one counter in the current data structure is older than the corresponding counter in the message data structure. The method may update the counter that is older, e.g., to learn the most current age of the master copy of the resource known by the second node, based on the determination.

20 Claims, 6 Drawing Sheets

UTILIZATION OF DATA STRUCTURES TO SYNCHRONIZE COPIES OF A RESOURCE

I. FIELD OF THE DISCLOSURE

The present disclosure relates generally to synchronizing copies of a resource.

II. BACKGROUND

To reduce contention over a single copy of a resource in a multi-node computing system, the multi-node computing system may include multiple copies of the resource. For example, multiple copies of the resource may be distributed among multiple nodes of the multi-node computing system. However, at various points in a linear progression of virtual time, certain copies may become unsynchronized and may need to be synchronized. Typically, multiple handshakes may have to take place to even learn that a first copy is more updated than a second copy, and as a result, the second copy is stale and should be synchronized. Thus, actions related to synchronization of copies of a resource may lead to bottlenecks and inefficiencies. Moreover, the higher the number of nodes, the higher the number of resources, and the higher the number of copies of each resource in the multi-node computing system, the higher the potential for bottlenecks and inefficiencies.

III. SUMMARY OF THE DISCLOSURE

In a particular embodiment, a method of utilizing data structures to synchronize copies of a resource may include receiving, at a first node of a multi-node computing system, a first message with a first message data structure from a second node of the multi-node computing system. The first message data structure may include a counter for each resource of a plurality of resources that is indicative of a most current age of a master copy of the resource known by the second node. The first node may include a current data structure with a counter for each resource of the plurality of resources that is indicative of a most current age of the master copy of the resource known by the first node. The counter for a resource in the first message data structure corresponds with the counter for the resource in the current data structure. The method may also determine, at the first node, whether at least one counter of a resource of the plurality of resources in the current data structure of the first node is older than the corresponding counter of the resource in the message data structure of the first message. The method may also update, at the first node, the counter of the resource in the current data structure that is older with the corresponding counter of the resource in the first message data structure to learn the most current age of the master copy of the resource known by the second node based on the determination.

In another embodiment, an apparatus may include a memory storing program code, and a processor configured to access the memory and execute the program code to receive, at a first node of a multi-node computing system, a first message with a first message data structure from a second node of the multi-node computing system. The first message data structure may include a counter for each resource of a plurality of resources that is indicative of a most current age of a master copy of the resource known by the second node. The first node may include a current data structure with a counter for each resource of the plurality of resources that is indicative of a most current age of the master copy of the resource known by the first node. The counter for a resource in the first message data structure corresponds with the counter for the resource in the current data structure. The processor may also be configured to execute program code to determine, at the first node, whether at least one counter of a resource of the plurality of resources in the current data structure of the first node is older than the corresponding counter of the resource in the message data structure of the first message. The processor may also be configured to execute program code to update, at the first node, the counter of the resource in the current data structure that is older with the corresponding counter of the resource in the first message data structure to learn the most current age of the master copy of the resource known by the second node based on the determination.

Another particular embodiment may include a program product that includes program code to receive, at a first node of a multi-node computing system, a first message with a first message data structure from a second node of the multi-node computing system. The first message data structure may include a counter for each resource of a plurality of resources that is indicative of a most current age of a master copy of the resource known by the second node. The first node may include a current data structure with a counter for each resource of the plurality of resources that is indicative of a most current age of the master copy of the resource known by the first node. The counter for a resource in the first message data structure corresponds with the counter for the resource in the current data structure. The program code may also determine, at the first node, whether at least one counter of a resource of the plurality of resources in the current data structure of the first node is older than the corresponding counter of the resource in the message data structure of the first message. The program code may also update, at the first node, the counter of the resource in the current data structure that is older with the corresponding counter of the resource in the first message data structure to learn the most current age of the master copy of the resource known by the second node based on the determination. The program product may further include a computer readable medium bearing the program code.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
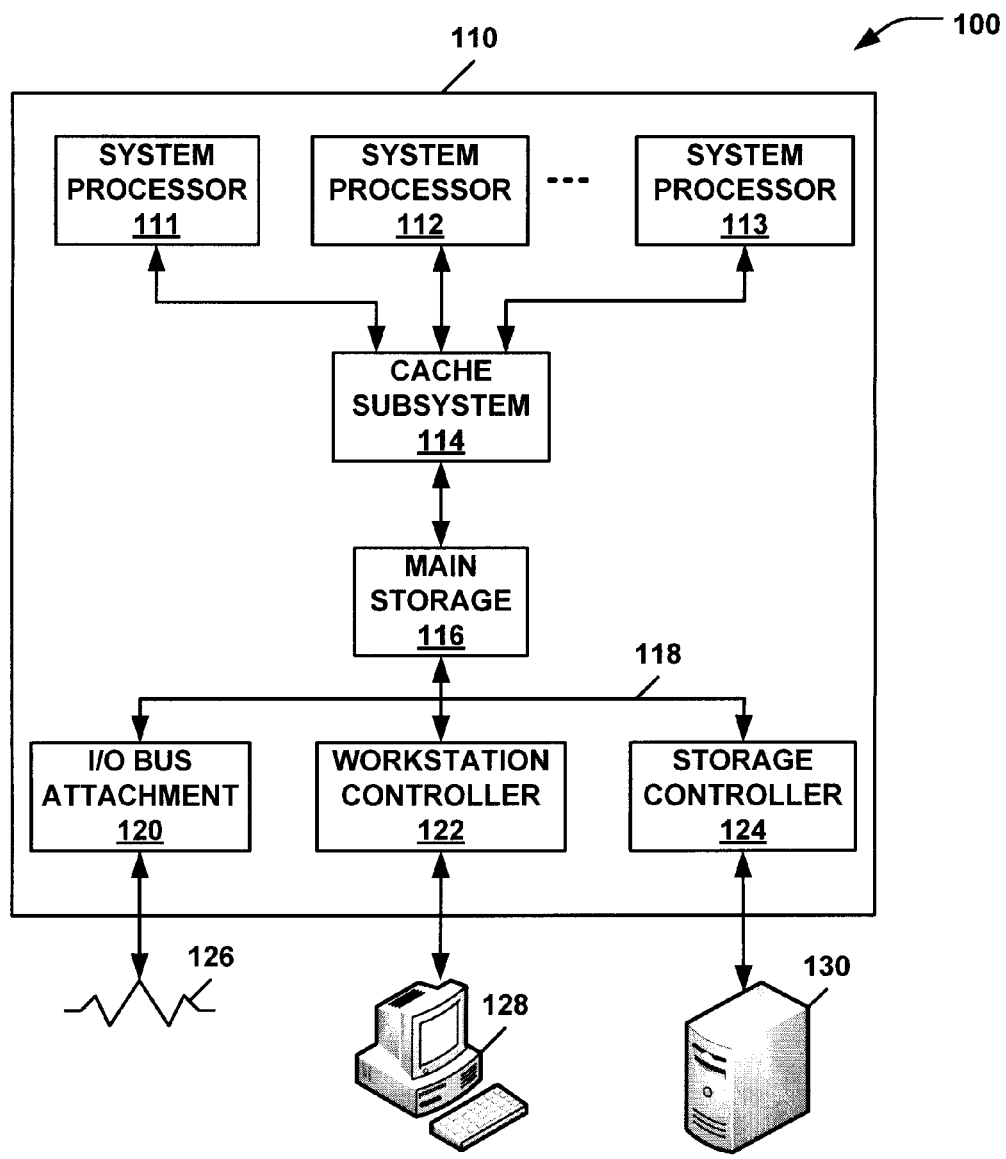
FIG. 1 is a block diagram of an apparatus configured to utilize data structures to synchronize copies of a resource in a manner consistent with an embodiment.

A variety of data structures are described herein that may be utilized to synchronize copies of a resource that are distributed among nodes of a multi-node computing system. The resource may be a table (e.g., a database table), a file, a variable, or practically any entity that may change over a linear progression of virtual time with copies distributed among nodes of the multi-node computing system. The resource, or more specifically a master copy of the resource, may be stored in a master node of the multi-node computing system, and local copies of the resource may be stored in member nodes of the multi-node computing system. The data structures include message data structures, current data structures, and local data structures.

Over a linear progression of virtual time, copies of a resource may become unsynchronized as messages are processed in a multi-node computing system. For example, a master copy of the resource on a master node may process a message requesting an update of the master copy, and the master copy of the resource may become more updated than a certain local copy of the resource on a member node. Indeed, over the linear progression of virtual time, there may be a linear progression of updates. As such, before the member node reads the certain local copy of the resource to process a message, the member node may send a message to the master node in order to learn whether the master copy is more updated than the certain local copy. If the response from the master node indicates that the master copy is more updated, the member node may request an update from the master node. The master node may respond to the request for the update by sending the update to all member nodes of the multi-node computing system, including member nodes that may not need the update, in order to maintain the various copies of the resource in sync, referred to as flushing the update. All of the member nodes may respond to the update from the master node by updating their local copies of the resource. Indeed, the multi-node computing system may practically come to a halt due to flushing of the update.

This sequence includes multiple handshakes, including multiple handshakes between the master node and the member node to even learn whether the master copy is more updated than the certain local copy. Moreover, practically all of the member nodes of the multi-node computing system may have to check with the master node to ensure that their local copies of the resource are as updated as the master copy before reading their local copies. Thus, the extra handshakes for read operations may lead to bottlenecks and inefficiencies. Furthermore, bottlenecks and inefficiencies may also result from the master node flushing the update to all of the member nodes, as well as from the member nodes receiving and updating their local copies due to the flushed update. Indeed, the higher the number of nodes, the higher the number of resources, and the higher the number of copies of each resource in the multi-node computing system, the higher the potential for bottlenecks and inefficiencies.

Sometimes, a member node may keep track of a virtual clock for each table in a database, which may allow comparisons of how new data in each table may be. On a write operation, the virtual clock of the affected table or tables may be increased by one. On a read operation, a member node may compare its virtual clock for each table against the corresponding master node's virtual clock in order to determine if the member node should request an update from the master node, rather than read its own local copy of the table. However, as explained hereinabove, there are still handshakes (e.g., the member node may have to request the master node's virtual clocks for the comparison and the master node may have to respond to the request from the member node) between the member node and the master node to even determine whether the master copy of a table is more updated than the local copy of the table.

However, as will be described herein, a member node of the multi-node computing system may utilize data structures, such as a message data structure, a current data structure, and/or a local data structure, to synchronize copies of a resource. For example, the member node may learn via the data structures whether its local copy of a resource is sufficiently updated to be read to process a message, potentially reducing handshakes to learn this information, bottlenecks, and inefficiencies. Indeed, the member node may learn that its local copy is up to date and readable without reading from or even communicating with the master node. Moreover, instead of the master node flushing updates to all member nodes, an update may be deferred until a member node requests the update. For example, a member node may request an update in response to learning via the data structures that the local copy is insufficiently updated to be read, potentially reducing bottlenecks and inefficiencies even further. Furthermore, the local copy may be updated by multiple deferred processing cycles when it is updated. In conclusion, the data structures may enable nodes of the multi-node computing system to make decisions regarding synchronizing copies of a resource, as well as maintain linear sequentiality.

Turning more particularly to the drawings, FIG. 1 generally illustrates a data processing apparatus 100 consistent with an embodiment. For example, the apparatus 100 may be an embodiment of a node (e.g., a member node or a master node) of a multi-node computing system. As such, the multi-node computing system may include a plurality of the apparatus 100. Alternatively, in some embodiments, the apparatus 100 may be an embodiment of a multi-node computing system with a plurality of nodes, instead of an embodiment of a node.

The apparatus 100, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 110 may be a multi-user computer, such as a computer available from International Business Machines Corporation (IBM).

The computer 110 generally includes one or more physical processors 111, 112, 113 coupled to a memory subsystem including a main storage 116. The main storage 116 may include one or more dual in-line memory modules (DIMMs). The DIMM may include an array of dynamic random access memory (DRAM). Another or the same embodiment may include a main storage having a static random access memory (SRAM), a flash memory, a hard disk drive, and/or another digital storage medium. The processors 111, 112, 113 may be multithreaded and/or may have multiple cores. A cache subsystem 114 is illustrated as interposed between the processors 111, 112, 113 and the main storage 116. The cache subsystem 114 typically includes one or more levels of data, instruction and/or combination caches, with certain caches either serving individual processors or multiple processors.

The main storage 116 may be coupled to a number of external input/output (I/O) devices via a system bus 118 and a plurality of interface devices, e.g., an I/O bus attachment interface 120, a workstation controller 122, and/or a storage controller 124 that respectively provide external access to one or more external networks 126, one or more workstations 128, and/or one or more storage devices such as a direct access storage device (DASD) 130. The system bus 118 may also be coupled to a user input (not shown) operable by a user of the computer 110 to enter data (i.e., the user input sources may include a mouse, a keyboard, etc.) and a display (not shown) operable to display data from the computer 110 (i.e., the display may be a CRT monitor, an LCD display panel, etc.). The computer 110 may be configured as a node (e.g., a master node or a member node) of a multi-node computing system and communicate with other nodes of that multi-node computing system through a network 126.

Figure 2:
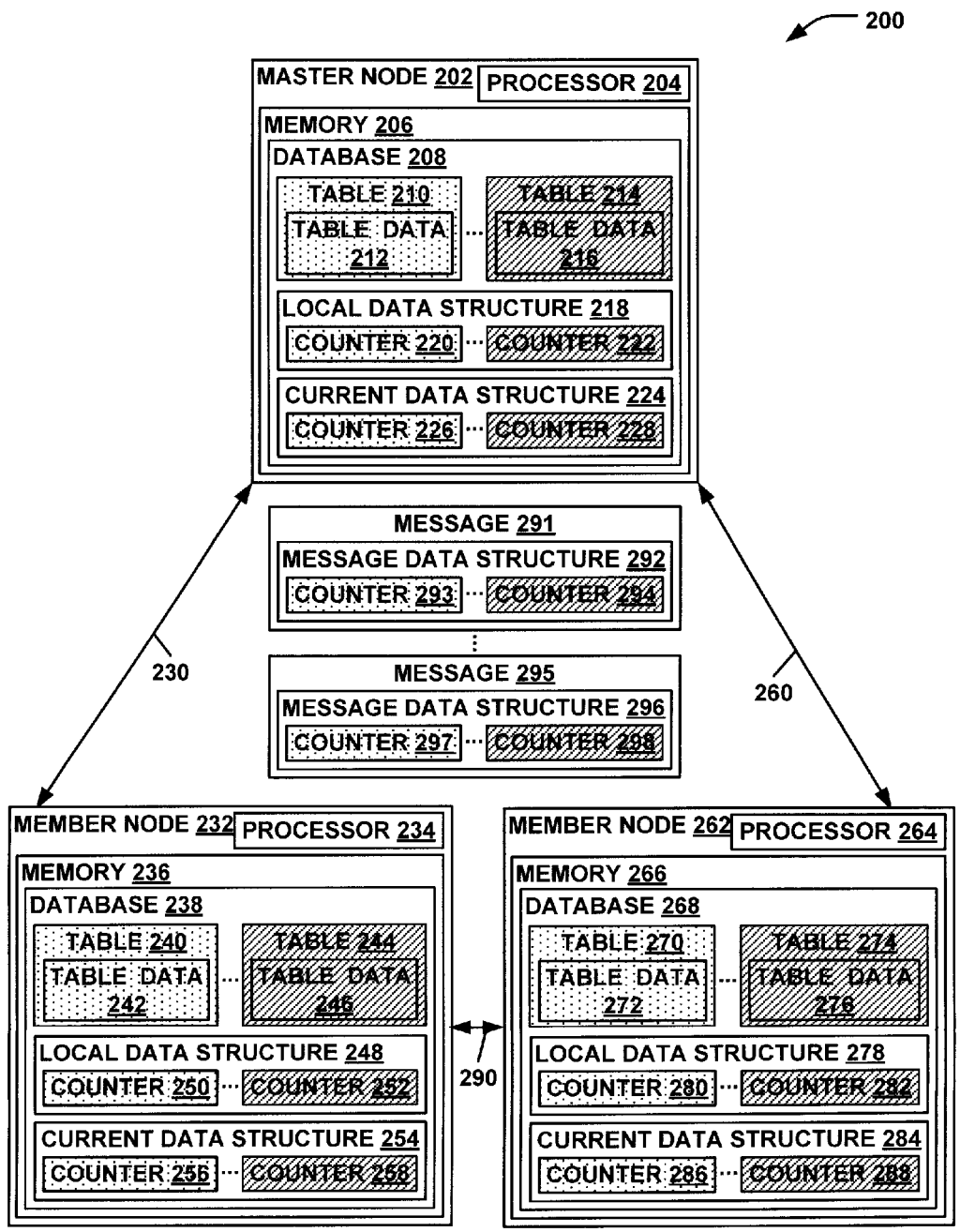
FIG. 2 is a block diagram of the primary software components and hardware components of the apparatus of FIG. 1.

Turning to FIG. 2, this figure illustrates a block diagram of the primary software components and hardware components of the apparatus 100 of FIG. 1. Moreover, FIG. 2 illustrates an exemplary multi-node computing system 200 with a plurality of nodes, such as a distributed computing system. As illustrated, the plurality of nodes of the multi-node computing system 200 may include a master node 202, a member node 232, and a member node 262, and each of these nodes may be similar to the apparatus 100 of FIG. 1. Alternatively, in some embodiments, the multi-node computing system 200 may be similar to the apparatus 100 of FIG. 1. Nonetheless, each of the nodes of the plurality of nodes may be interconnected and may communicate with each other. In some embodiments, the nodes of the plurality of nodes may be firmware components in separate chassis, or simply entities with individual processors and their own memories (e.g., cache or other storage) seeking to keep copies of a resource in sync.

A plurality of resources may be utilized by the nodes of the multi-node computing 200. As such, each of the master node 202, the member node 232, and the member node 262 may include a copy of each resource of the plurality of resources. For simplicity, in FIG. 2, the plurality of resources includes a first resource that is a table and a second resource that is a table, but the plurality of resources may include more than two resources. Moreover, the resources do not have to be the same type, for example, the first resource may be a variable and the second resource may be a table. For simplicity, items illustrated in FIG. 2 with poke-a-dots are related to the first resource, while items illustrated with diagonal stripes are related to the second resource. Furthermore, for simplicity, three nodes are illustrated in FIG. 2, but the multi-node computing system 200 may include more than three nodes.

Turning to the master node 202 of FIG. 2, the master node 202 may have acquired its role as the master node through an election process. For example, any node of the multi-node computing system 200 may be elected (e.g., randomly or based on a rule) to perform the role of the master node. Alternatively, any node of the multi-node computing system 200 may simply be designated as the master node to perform the role of the master node. For simplicity, it is assumed that the master node 202 has already acquired the role of the master node.

The master node 202 may include at least one processor 204 or central processing unit (CPU) coupled with at least one memory 206. The processor 204 may be incorporated into the system processors 111, 112, 113 illustrated in FIG. 1, or into a separate processor. The memory 206 may be incorporated into the cache subsystem 114, the main storage 116, or the DASD 130 illustrated in FIG. 1, or into a separate memory. The processor 204 may be configured to execute program code stored on the memory 206, and the program code may cause the master node 202 to perform operations such as those described herein. The processor 204 performs operations during processing cycles (also referred to as "clock cycles" or "cycles.")

The plurality of resources, or more specifically, master copies of the plurality of resources may also be stored on the memory 206. For example, the memory 206 may store at least one database, such as a database 208, and the database 208 may include at least one table, such as a table 210 with corresponding table data 212 and a table 214 with corresponding table data 216. The table 210 may be the first resource, or more specifically, the master copy of the first resource. Similarly, the table 214 may be the second resource, or more specifically, the master copy of the second resource. As illustrated by the poke-a-dots and the diagonal stripes, local copies of the first and second resources may be stored on the member nodes 232, 262, which may be synchronized with the tables 210, 214 on the master node 202.

The master node 202 may be solely configured to update the tables 210, 214 in order to ensure accurate master copies for synchronization. Updates may include deletions to the tables 210, 214, insertions to the tables 210, 214, or other modifications to the tables 210, 214. Requests to update the tables 210, 214 may be received by the master node 202 from the member nodes 232, 262. Furthermore, the tables 210, 214 may be updated at different points in a linear progression of virtual time (e.g., linear progression of processing cycles). Indeed, over the linear progression of virtual time, there may be a linear progression of updates. For example, the table 210 may be updated at virtual time A (e.g., corresponding to processing cycle A), the table 210 may be updated at virtual time B (e.g., corresponding to processing cycle B) after the virtual time A, the table 210 may be updated at virtual time C (e.g., corresponding to processing cycle C) after the virtual time B, the table 214 may be updated at virtual time D (e.g., corresponding to processing cycle D) after the virtual time C, and so on.

The master node 202 may include a local data structure with a counter for each resource of the plurality of resources. In the local data structure of the master node 202, a counter of a resource is indicative of a local age of a local copy of the resource stored at the master node 202 (i.e., local age of a master copy). For example, a local data structure 218 may include a counter 220 indicative of a local age of the table 210, as well as a counter 222 indicative of a local age of the table 214. Each time that the master node 202 updates the table 210, the counter 220 may be updated (e.g., incremented by one, incremented by more than one, etc.) by the master node 202. Similarly, each time that the master node 202 updates the table 214, the counter 222 may be updated (e.g., incremented by one, incremented by more than one, etc.) by the master node 202. In some embodiments, the counters 220, 222 may be updated by decrementing instead of incrementing.

The master node 202 may also include a current data structure with a counter for each resource of the plurality of resources. In the current data structure of the master node 202, a counter of a resource is indicative of a most current age of a master copy of the resource known by the master node 202. The counter for a resource in the current data structure may correspond with a counter for the resource in the local data structure, and vice versa. For example, a current data structure 224 may include a counter 226 indicative of a most current age of the table 210 known by the master node 202, as well as a counter 228 indicative of a most current age of the table 214 known by the master node 202. The counters 226, 228 of the current data structure 224 may be updated with the counters 220, 222 of the local data structure 218, respectively. As an example, the master node 202 may perform an update to the table 210, the counter 220 of the local data structure 218 may be updated in response to the update to the table 210, and the counter 226 of the current data structure 224 may be updated with the new value of the counter 220 of the local data structure 218. Similarly, the master node 202 may perform an update to the table 214, the counter 222 of the local data structure 218 may be updated in response to the update to the table 214, and the counter 228 of the current data structure 224 may be updated with the new value of the counter 222 of the local data structure 218. As a result, on the master node 202, the counters 226, 228 of the current data structure 224 may likely be about the same (e.g., the same value) as the counters 220, 222 of the local data structure 218, respectively.

Even though the counters 226, 228 will likely be about the same (e.g., the same value) as the counters 220, 222, both the local data structure 218 and the current data structure 224 may be stored on the master node 202 for consistency with local data structures and current data structures of the member nodes 232, 262. However, as will be explained further herein, counters of local data structures and corresponding counters of current data structures on the member nodes 232, 262 may include different values. For example, a most current age of a master copy of a resource known by the member node 232, learned from a message received by the member node 232 (e.g., a message 291 or a message 295 to be discussed further hereinbelow), may be different from a local age of a local copy of that resource. The master node 202 will likely not receive any message with a more current age of a master copy of a resource because the master copies are already stored on the master node 202 and only the master node 202 may be configured to update master copies. Indeed, information on the master node 202, such as the tables 210, 214, the local data structure 218, and the current data structure 224 will likely be the newest or closest to real-time in the multi-node computing system 200.

Turning to the member node 232 of FIG. 2, the member node 232 and the master node 202 may engage in bidirectional communication, as illustrated by connection 230. For example, the member node 232 may be coupled (e.g., wirelessly or wired) with the master node 202 in a manner that enables the member node 232 to receive messages (e.g., the messages 291, 295) from the master node 202, as well as in a manner that enables the member node 232 to send messages (e.g., the messages 291, 295) to the master node 202. Similarly, as illustrated by connection 290, the member node 232 may be coupled (e.g., wirelessly or wired) with the member node 262 in a manner that enables the member node 232 to receive messages (e.g., the messages 291, 295) from the member node 262, as well as in a manner that enables the member node 232 to send messages (e.g., the messages 291, 295) to the member node 262.

The member node 232 may include at least one processor 234 or central processing unit (CPU) coupled with at least one memory 236. The processor 234 may be incorporated into the system processors 111, 112, 113 illustrated in FIG. 1, or into a separate processor. The memory 236 may be incorporated into the cache subsystem 114, the main storage 116, or the DASD 130 illustrated in FIG. 1, or into a separate memory. The processor 234 may be configured to execute program code stored on the memory 236, and the program code may cause the member node 232 to perform operations such as those described herein. The processor 234 performs operations during processing cycles.

The local copies of the first and second resources of the plurality of resources may be stored on the memory 236 of the member node 232. For example, the memory 236 may store at least one database, such as a database 238, and the database 238 may include at least one table, such as a table 240 with corresponding table data 242 and a table 244 with corresponding table data 246. The table 240 may be the local copy of the first resource. Similarly, the table 244 may be the local copy of the second resource.

The tables 240, 244 on the member nodes 232 may be synchronized with the tables 210, 214 on the master node 202, respectively. For example, as illustrated by the shading, the table 240 of the member node 232 may be synchronized with the table 210 of the master node 202, and the table 244 of the member node 232 may be synchronized with the table 214 of the master node 202. As an example, the member node 232 may send a message, such as the message 291, to the master node 202 requesting an update of its local copy of a particular resource, such as requesting an update of table 240. The member node 232 may receive a message, such as the message 295, from the master node 202 with the update for the table 240 from the table 210. The member node 232 may be configured to update the table 240 with the update received from the master node 202, and as such, the table 240 may be synchronized with the table 210. The table 244 may be updated by the member node 232 in a similar manner. The tables 240, 244 may be updated at different points in the linear progression of virtual time. Indeed, over the linear progression of virtual time, there may be a linear progression of updates. Updates may include deletions to the tables 240, 244, insertions to the tables 240, 244, or other modifications to the tables 240, 244.

The member node 232 may be able to make decisions regarding synchronization of the tables 240, 244, such as when to request an update from the master node 202, via data structures. In particular, the member node 232 may include a local data structure with a counter for each resource of the plurality of resources. In the local data structure of the member node 232, a counter of a resource is indicative of a local age of a local copy of the resource stored at the member node 232. For example, a local data structure 248 may include a counter 250 indicative of a local age of the table 240, as well as a counter 252 indicative of a local age of the table 244. Each time that the member node 232 updates the table 240, the counter 250 may be updated (e.g., incremented by one, incremented by more than one, etc.) by the member node 232. Similarly, each time that the member node 232 updates the table 244, the counter 252 may be updated (e.g., incremented by one, incremented by more than one, etc.) by the member node 232. The counters 250, 252 of the member node 232 may be updated by decrementing instead of incrementing depending on the implementation.

The member node 232 may also include a current data structure with a counter for each resource of the plurality of resources. In the current data structure of the member node 232, a counter of a resource is indicative of a most current age of a master copy of the resource known by the member node 232. The counter for a resource in the current data structure may correspond with a counter for the resource in the local data structure, and vice versa. For example, a current data structure 254 may include a counter 256 indicative of a most current age of the table 210 known by the member node 232, as well as a counter 258 indicative of a most current age of the table 214 known by the member node 232. The most current ages of the table 210, 214 in the counters 256, 258 of the current data structure 254 of the member node 232 may be learned by the member node 232 from messages (e.g., the messages 291, 295) received by the member node 232.

Specifically, the member node 232 may receive at least one message, such as the message 291 or the message 295, from any node of the multi-node computing system 200. The message 291 may be a response, a request, an update (e.g., a database update), include a reading task (e.g., the message 291 may include a read query and a copy of a resource may have to be read due to the read query), include a writing task (e.g., the message 291 may be an update to a copy of a resource), any combination thereof, etc. Alternatively, the message 291 may simply include an acknowledgement indicating whether an action was performed or not performed. The message 291 may be practically any kind of message or inter-process communication that may be sent or received by nodes of the multi-node computing system 200.

The message 291 may include a message data structure with a counter for each resource of the plurality of resources. In the message data structure of the message 291, a counter of a resource is indicative of a most current age of a master copy of the resource known by a node sending the message 291. The counter for a resource in the message data structure may correspond with a counter for the resource in a current data structure, and vice versa. The counter for a resource in the message data structure may correspond with a counter for the resource in a local data structure, and vice versa. For example, a message data structure 292 embedded within the message 291 may include a counter 293 indicative of a most current age of the table 210 known by the node (e.g., the master node 202 or the member node 262) that sent the message 291, as well as a counter 294 indicative of a most current age of the table 214 known by the node (e.g., the master node 202 or the member node 262) that sent the message 291. In other words, the counters 293, 294 of the message data structure 292 of the message 291 may be about the same (e.g., same value) as corresponding counters of a current data structure of the node that sent the message 291.

As an example, if the message 291 is sent to the member node 232 by the master node 202, then the counters 293, 294 of the message data structure 292 may be about the same (e.g., same value) as the counters 226, 228 of the current data structure 224 of the master node 202, respectively. Similarly, if the message 291 is sent to the member node 232 by the member node 262, then the counters 293, 294 of the message data structure 292 may be about the same (e.g., same value) as counters 286, 288 of a current data structure 284 of the member node 262 to be discussed further herein.

Similarly, the message 295 may be a response, a request, an update (e.g., a database update), include a reading task (e.g., the message 295 may include a read query and a copy of a resource may have to be read due to the read query), include a writing task (e.g., the message 295 may be an update to a copy of a resource), any combination thereof, etc. Alternatively, the message 295 may simply include an acknowledgement indicating whether an action was performed or not performed. The message 295 may be practically any kind of message or inter-process communication that may be sent or received by nodes of the multi-node computing system 200.

The message 295 may include a message data structure with a counter for each resource of the plurality of resources. In the message data structure of the message 295, a counter of a resource is indicative of a most current age of a master copy of the resource known by a node sending the message 295. The counter for a resource in the message data structure may correspond with a counter for the resource in a current data structure, and vice versa. The counter for a resource in the message data structure may also correspond with a counter for the resource in a local data structure, and vice versa. For example, a message data structure 296 of the message 295 may include a counter 297 indicative of a most current age of the table 210 known by the node (e.g., the master node 202 or the member node 262) that sent the message 295, as well as a counter 298 indicative of a most current age of the 214 known by the node (e.g., the master node 202 or the member node 262) that sent the message 295. In other words, the counters 297, 298 of the message data structure 296 of the message 295 may be about the same (e.g., same value) as corresponding counters of a current data structure of the node that sent the message 295.

As an example, if the message 295 is sent to the member node 232 by the master node 202, then the counters 297, 298 of the message data structure 296 may be about the same (e.g., same value) as the counters 226, 228 of the current data structure 224 of the master node 202. Similarly, if the message 295 is sent to the member node 232 by the member node 262, then the counters 297, 298 of the message data structure 296 may be about the same (e.g., same value) as the counters 286, 288 of the current data structure 284 of the member node 262 to be discussed further herein.

The member node 232 may also send at least one message, such as the message 291 or the message 295, to any node (e.g., the master node 202 or the member node 262) of the multi-node computing system 200. As an example, if the message 291 is sent by the member node 232, then the counters 293, 294 of the message data structure 292 may be about the same (e.g., same value) as the counters 256, 258 of the current data structure 254 of the member node 232. Similarly, if the message 295 is sent by the member node 232, then the counters 297, 298 of the message data structure 296 may be about the same (e.g., same value) as the counters 256, 258 of the current data structure 254 of the member node 232.

Turning to the member node 262 of FIG. 2, the member node 262 and the master node 202 may engage in bidirectional communication, as illustrated by connection 260. For example, the member node 262 may be coupled (e.g., wirelessly or wired) with the master node 202 in a manner that enables the member node 262 to receive messages (e.g., the messages 291, 295) from the master node 202, as well as in a manner that enables the member node 262 to send messages (e.g., the messages 291, 295) to the master node 202. Similarly, as illustrated by connection 290, the member node 262 may be coupled (e.g., wirelessly or wired) with the member node 232 in a manner that enables the member node 262 to receive messages (e.g., the messages 291, 295) from the member node 232, as well as in a manner that enables the member node 262 to send messages (e.g., the messages 291, 295) to the member node 232.

The member node 262 may include at least one processor 264 or central processing unit (CPU) coupled with at least one memory 266. The processor 264 may be incorporated into the system processors 111, 112, 113 illustrated in FIG. 1, or into a separate processor. The memory 266 may be incorporated into the cache subsystem 114, the main storage 116, or the DASD 130 illustrated in FIG. 1, or into a separate memory. The processor 264 may be configured to execute program code stored on the memory 266, and the program code may cause the member node 262 to perform operations such as those described herein. The processor 264 performs operations during processing cycles.

The local copies of the first and second resources of the plurality of resources may be stored on the memory 266 of the member node 262. For example, the memory 266 may store at least one database, such as a database 268, and the database 268 may include at least one table, such as a table 270 with corresponding table data 272 and a table 274 with corresponding table data 276. The table 270 may be the local copy of the first resource. Similarly, the table 274 may be the local copy of the second resource.

The tables 270, 274 on the member nodes 262 may be synchronized with the tables 210, 214 on the master node 202. For example, as illustrated by the shading, the table 270 of the member node 262 may be synchronized with the table 210 of the master node 202, and the table 274 of the member node 262 may be synchronized with the table 214 of the master node 202. As an example, the member node 262 may send a message, such as the message 291, to the master node 202 requesting an update of its local copy of a particular resource, such as requesting an update of table 270. The member node 262 may receive a message, such as the message 295, from the master node 202 with the update for the table 270 from the table 210. The member node 262 be configured to update the table 270 with the update received from the master node 202, and as such, the table 270 may be synchronized with the table 210. The table 274 may be updated by the member node 262 in a similar manner. The tables 270, 274 may be updated at different points in the linear progression of virtual time. Indeed, over the linear progression of virtual time, there may be a linear progression of updates. Updates may include deletions to the tables 270, 274, insertions to the tables 270, 274, or other modifications to the tables 270, 274.

The member node 262 may be able to make decisions regarding synchronization of the tables 270, 274, such as when to request an update from the master node 202, via data structures. In particular, the member node 262 may include a local data structure with a counter for each resource of the plurality of resources. In the local data structure of the member node 262, a counter of a resource is indicative of a local age of a local copy of the resource stored at the member node 262. For example, a local data structure 278 may include a counter 280 indicative of a local age of the table 270, as well as a counter 282 indicative of a local age of the table 274. Each time that the member node 262 updates the table 270, the counter 280 may be updated (e.g., incremented by one, incremented by more than one, etc.) by the member node 262. Similarly, each time that the member node 262 updates the table 274, the counter 282 may be updated (e.g., incremented by one, incremented by more than one, etc.) by the member node 262. The counters 280, 282 of the member node 262 may be updated by decrementing instead of incrementing depending on the implementation.

The member node 262 may also include a current data structure with a counter for each resource of the plurality of resources. In the current data structure of the member node 262, a counter of a resource is indicative of a most current age of a master copy of the resource known by the member node 262. The counter for a resource in the current data structure may correspond with a counter for the resource in the local data structure, and vice versa. For example, the current data structure 284 may include a counter 286 indicative of a most current age of the table 210 known by the member node 262, as well as a counter 288 indicative of a most current age of the table 214 known by the member node 262. The most current ages of the table 210, 214 in the counters 286, 288 of the current data structure 284 of the member node 262 may be learned by the member node 262 from messages received by the member node 262.

Specifically, the member node 262 may receive at least one message, such as the message 291 or the message 295, from any node of the multi-node computing system 200. As an example, if the message 291 is sent to the member node 262 by the master node 202, then the counters 293, 294 of the message data structure 292 may be about the same (e.g., same value) as the counters 226, 228 of the current data structure 224 of the master node 202. Similarly, if the message 291 is sent to the member node 262 by the member node 232, then the counters 293, 294 of the message data structure 292 may be about the same (e.g., same value) as counters 256, 258 of the current data structure 254 of the member node 232. As another example, if the message 295 is sent to the member node 262 by the master node 202, then the counters 297, 298 of the message data structure 296 may be about the same (e.g., same value) as the counters 226, 228 of the current data structure 224 of the master node 202. Similarly, if the message 295 is sent to the member node 262 by the member node 232, then the counters 297, 298 of the message data structure 296 may be about the same (e.g., same value) as the counters 256, 258 of the current data structure 254 of the member node 232.

The member node 262 may also send at least one message, such as the message 291 or the message 295, to any node (e.g., the master node 202 or the member node 232) of the multi-node computing system 200. As an example, if the message 291 is sent by the member node 262, then the counters 293, 294 of the message data structure 292 may be about the same (e.g., same value) as the counters 286, 288 of the current data structure 284 of the member node 262. Similarly, if the message 295 is sent by the member node 262, then the counters 297, 298 of the message data structure 296 may be about the same (e.g., same value) as the counters 286, 288 of the current data structure 284 of the member node 262.

Those of ordinary skill in the art will appreciate that each of the local data structures 218, 248, 278, the current data structures 224, 254, 284, and the message data structures 292, 296 may be practically any data structure with corresponding counters for each resource of the plurality of resources. For example, each of the local data structures 218, 248, 278, the current data structures 224, 254, 284, and the message data structures 291, 295 may include a vector clock with a counter (or a virtual clock) for each resource of the plurality of resources. However, practically any data structure that tracks a linear progression of updates, or indicates before and after relationships, may be utilized.

Each of the local data structures 218, 248, 278, the current data structures 224, 254, 284, and the message data structures 292, 296 should include about a same quantity of counters (e.g., the same quantity of counters), and the quantity of counters may be dependent on a quantity of resources of the plurality of resources. It may also be helpful for the counters to be updated in about a same way (e.g., in the same way) for accuracy. For example, if the master node 202 updates the counters 220, 222 of the local data structure 218 by incrementing, then the member nodes 232, 262 should update the counters 250, 252 of the local data structure 248 and the counters 280, 282 of the local data structure 278 by incrementing, respectively.

Counters of each of the local data structures 218, 248, 278, the current data structures 224, 254, 284, and the message data structures 292, 296 may include practically any kind of value that may be compared, for example, to determine if a counter of a resource is older than a corresponding counter of the resource (or vice versa enables a comparison to determine if a counter of a resource is as new as or newer than a corresponding counter of the resource). For example, a value of a counter may simply be a numerical value that may be updated by incrementing or decrementing.

As an alternative, a value of a counter may be a timestamp, such as a timestamp of about sixty-four bits, which may tick up or may tick down. The timestamp may represent virtual time, not wall clock time. As an example, if the master node 202 updates the table 210, a timestamp value of the counter 220 of the local data structure 218 may be updated with the master node 202's virtual time at the point when the table 210 was updated. To reduce scenarios where the master node 202, the member node 232, and the member node 262 may have different virtual times for the same point, the master node 202's virtual time may be utilized for accuracy.

Additionally, counters of each of the local data structures 218, 248, 278, the current data structures 224, 254, 284, and the message data structures 292, 296 may be practically any size. For example, a counter may be about 64 bits, such as a counter with a timestamp value of about 64 bits. However, the seconds portion of the timestamp value may be extraneous, and therefore, the seconds portion may or may not be utilized depending on the implementation. Indeed, the size of a counter may be about eight bits, about thirty-two bits, about sixty-four bits, smaller than about sixty-four bits, larger than about sixty-four bits, or practically any size.

Furthermore, counters of each of the local data structures 218, 248, 278, the current data structures 224, 254, 284, and the message data structures 292, 296 should be able to handle rollover scenarios (e.g., where a counter runs out of space and flips back to zero or fails to update properly). As flipping back to zero or failing to update properly may introduce inaccuracies, the master node 202, the member node 232, and the member node 262 may be configured to utilize counters that are arbitrarily large in size, detect rollovers, or otherwise handle overflow. In short, those of ordinary skill in the art will appreciate that many options may be available for the local data structures 218, 248, 278, the current data structures 224, 254, 284, and the message data structures 292, 296, and consistency may improve accuracy and facilitate comparisons.

In operation, substantially all of the nodes (e.g., all nodes) of the multi-node computing system 200 may maintain their local data structures and current data structures. Moreover, substantially all of the nodes (e.g., all nodes) of the multi-node computing system 200 may utilize a specific communication protocol, such as an inter-process communication protocol that may be implemented at an application layer above an operating system layer. The communication protocol may ensure that message data structures, such as the message data structures 292, 296, are embedded in substantially all inter-process communications or messages (e.g., all messages) that are sent by nodes of the multi-node computing system 200. Specifically, a transport layer may be configured to embed message data structures into messages, as well as enable use of generic references (e.g., use of node numbers or the term "master") and translate IP addresses. Message data structures may be transmitted from a node to one or more nodes via headers (e.g., header of the message 291). Indeed, message data structures may be embedded in messages without troubling or even informing the nodes (or applications thereof).

As an alternative, instead of all messages using this communication protocol, in some embodiments, use of this specific communication protocol may be a requisite for only messages that read, write, modify, or otherwise depend on synchronized data. Furthermore, in some embodiments, a particular node (or application thereof) may send and receive messages using some other communication protocol. In such a scenario, the particular node (or application thereof) may embed its message data structure into messages that it sends to other nodes, as well as handle actions that would otherwise be performed by the specific communication protocol.

Nonetheless, as an example, a second node may send a message via the communication protocol to a first node, and the communication protocol may embed a message data structure within the message reflecting the second node's current data structure. The first node may be configured to receive the message data structure embedded within the message, and perform comparisons using the message data structure, its current data structure, and its local data structure to determine if its local copies are sufficiently updated to process the message from the second node (e.g., has data that is not older, but is as new as or newer than the second node). Based on the comparisons, the first node may read a local copy, or may request an update from a master node and update its local copy in response to the received update. The first node may also update its current data structure and its local data structure, as appropriate.

In a particular example, node to node communications may occur that may result in an operation that needs to access a database. As such, each node may maintain virtual clocks for its local copy of the data in a local data structure that is a vector clock and for the most recent version of a master copy on the master node that it is aware of in a current data structure that is a vector clock. All inter-node communication may include the current virtual clock values for each table of the database in a message data structure, which is also a vector clock, from the node sending the communication (i.e., the caller). The node receiving the communication (i.e., the receiver) may update its current virtual clock for each table with the value that was sent from the caller when a virtual clock of the communication is greater than the currently stored value at the receiver (or when the currently stored value is older than the virtual clock of the communication). This would give the receiver more information about the age of the master's data at the time of the communication. Any necessary database operation that results from the inter-node communication could use the vector clock data from the caller to compare to the known values of the master's clock data stored in the current data structure. If the receiver's data is as new as the caller's current clock, the receiver can avoid the step of checking with the master node for newer data. This may result in improved read performance due to fewer handshakes with the master node, while maintaining sequential consistency.

Figure 3:
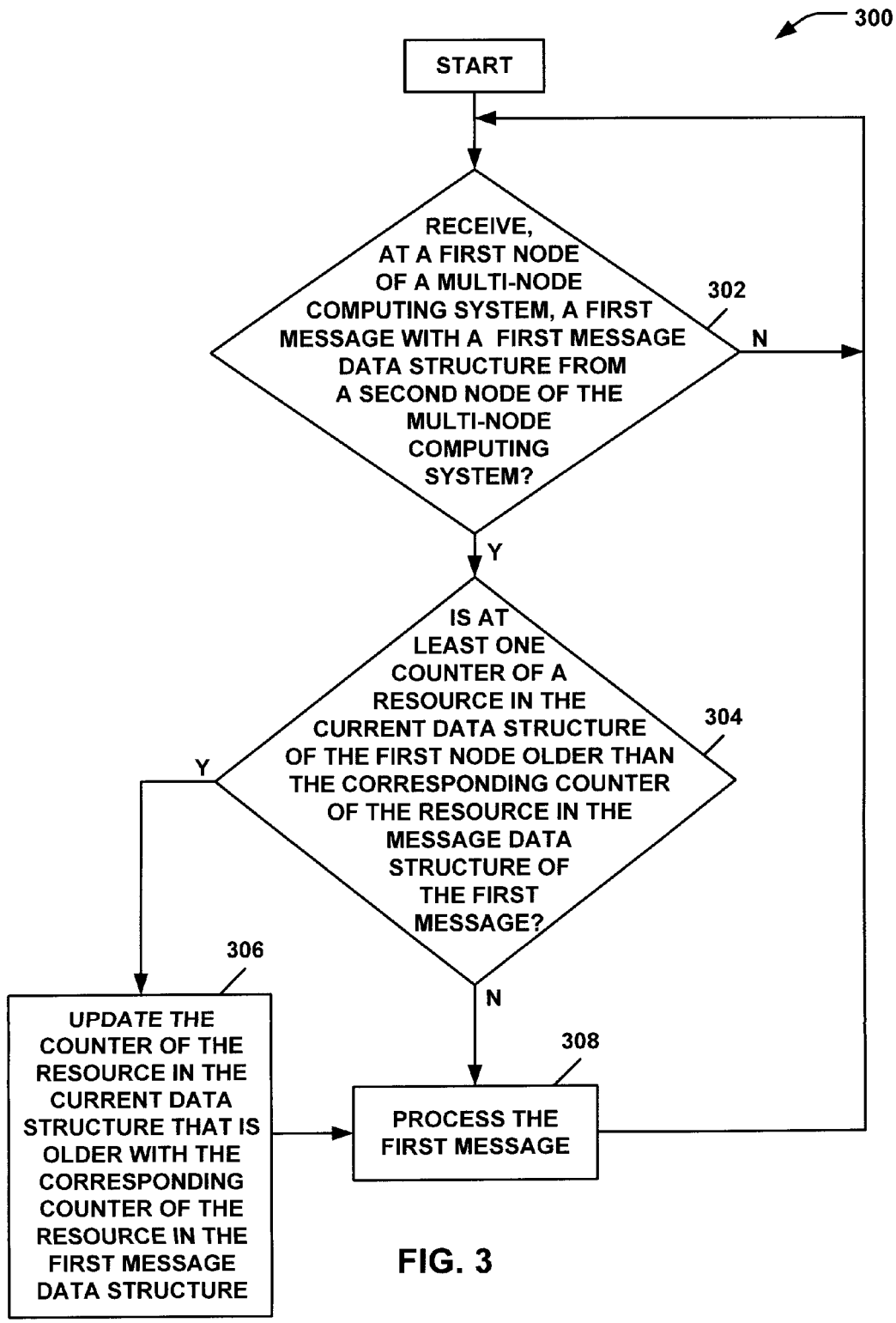
FIG. 3 is a flowchart of an embodiment of a method of utilizing data structures to synchronize copies of a resource using the apparatus of FIGS. 1-2.

Turning to FIG. 3, FIG. 3 is a flowchart 300 of an embodiment of a first method of utilizing data structures to synchronize copies of a resource using the apparatus of FIGS. 1-2. The flowchart 300 of FIG. 3 may be executed by the member node 232 or the member node 262, or even the master node 202 for consistency, of the multi-node computing system 200 of FIG. 2. The flowchart 300 may be executed every time a message is received. FIG. 2 will be referenced throughout the discussion of FIG. 3.

At 302, a first node of a multi-node computing system may determine if it has received a first message with a first message data structure from a second node of the multi-node computing system. The first message data structure may include a counter for each resource of a plurality of resources that is indicative of a most current age of a master copy of the resource known by the second node. The first node may include a current data structure with a counter for each resource of the plurality of resources that is indicative of a most current age of the master copy of the resource known by the first node. The counter for a resource in the first message data structure corresponds with the counter for the resource in the current data structure. For example, the member node 232 of the multi-node computing system 200 may determine if it has received a first message, such as the message 291, from a second node, such as the member node 262 (or the master node 202) via the connection 290. The message 291 may include the message data structure 292. The member node 232 may include the current data structure 254.

Control may pass to 304 in response to receiving the first message; otherwise, the first node may continue to wait for the first message at 302. At 304, the first node may determine whether at least one counter of a resource of the plurality of resources in the current data structure of the first node is older than the corresponding counter of the resource in the message data structure of the first message. Depending on the implementation, counters for all resources of the plurality of resources may be compared, or counters for less than all of the resources of the plurality of resources may be compared.

For example, the member node 232 may determine whether at least one counter of a resource of the plurality of resources in the current data structure 254 is older than the corresponding counter of the resource in the message data structure 292 of the message 291. If the message 291 includes a read query for a particular resource, in some embodiments, counters in the current data structure 254 and corresponding counters in the message data structure 292 for all resources may be compared by the member node 232 to determine if any counter in the current data structure 254 is older than the corresponding counter in the message data structure 292, even though the message 291 is about the particular resource. However, in some embodiments, only the counter in the current data structure 254 and the corresponding counter in the message data structure 292 for the particular resource may be compared by the member node 232 to determine if the counter in the current data structure 254 is older.

Specifically, if counters are updated by incrementing, then the counter 256 of the current data structure 254 with a lower value may be older than the corresponding counter 293 of the message data structure 292 with a higher value. Similarly, the counter 258 of the current data structure 254 with a lower value may be older than the corresponding counter 294 of the message data structure 292 with a higher value. In other words, if a counter of the current data structure 254 is less than (e.g., <) the corresponding counter of the message data structure 292, then the counter of the current data structure 254 may be older. Moreover, for example, if counters include timestamps, then the counter 256 with a timestamp that is older in virtual time may be older than the corresponding counter 293 with a timestamp that is newer in virtual time.

Where the first node determines that at least one counter of the current data structure is older, at 306, the first node may update the counter of the resource in the current data structure that is older with the corresponding counter of the resource in the first message data structure to learn the most current age of the master copy of the resource known by the second node. For example, based on which corresponding counters were compared at 304, the member node 232 may update at least one counter of the current data structure 254 that is older. For instance, if the member node 232 determines that the counter 256 in the current data structure 254 is older than the corresponding counter 293 in the message data structure 292, then the member node 232 may update the value of the counter 256 with the value of the counter 293. Similarly, if the member node 232 determines that the counter 258 in the current data structure 254 is older than the corresponding counter 294 in the message data structure 292, then the member node 232 may update the value of the counter 258 with the value of the counter 294. In other words, the member node 232 may select the higher value. Thus, the member node 232 has learned the most current ages of the master copies (e.g., most current ages of the table 210 and the table 214) known by the member node 262 without handshakes with the master node 202.

Specifically, in some embodiments, the counters 256, 258 of the current data structure 254 may be updated to equal the counters 293, 294 of the message data structure 292. However, in some embodiments, for example, it may possible for the counter 258 of the current data structure 254 to have a value that is as new as or newer than the corresponding counter 294 of the message data structure 292, and for the counter 256 of the current data structure 254 to have a value that is older than the corresponding counter 293 of the message data structure 292. In such an example, the counter 258 may remain as is and the counter 256 may be updated. Thus, after the update to the current data structure 254, each counter of the current data structure 254 may be as new as or newer than the corresponding counter of the message data structure 292.

Control may pass to 308 after the update to the current data structure at 306. Control may also pass to 308 if the first node determines at 304 that there is no counter of the current data structure that is older than the corresponding counter of the message data structure. In other words, the member node 232 and the member node 262 have at least the same level of knowledge about the master copies on the master node 202.

Turning to 308, the first node may process the first message, which may be a request, a response, a database update, or practically any message, as appropriate. For example, the member node 232 may process the message 291, as appropriate. If the message 291 includes an acknowledgement, the acknowledgment may be processed. Furthermore, processing of the message 291 may depend upon whether the first message includes a reading task for a particular resource (e.g., a read query) or if the message includes a writing task for a particular resource (e.g., an update). Control may pass to flowchart 400 of FIG. 4 where the first message includes a read query. Lastly, the first node may determine if another message is received at the first node at 302. For example, the member node 232 may determine if another message is received at the member node 232, such as another message 291.

Thus, the member node 232 (or the member node 262) may execute the flowchart 300 and learn of newer ages of master copies of resources on the master node 202 from messages received from other nodes of the multi-node computing system 200, without handshakes to the master node 202. The newer ages may be utilized to update counters of current data structures of the member nodes 232, 262, and messages may be processed by the member nodes 232, 262. The master node 202 may also execute the flowchart 300.

For example, the master node 202 may receive the message 291 from the member node 262. The master node 202 may determine whether at least one counter of a resource of the plurality of resources in its current data structure 224 is older than the corresponding counter of the resource in the message data structure of the message 291. For example, the master node 202 may perform a comparison to make this determination as a check for accuracy (as the counters of the current data structure 224 will likely have the newest values). The master node 202 may also update the counter of the resource in its current data structure 224 that is older with the corresponding counter of the resource in the message data structure 292 to learn the most current age of the master copy of the resource known by the member node 262 based on the determination. For example, if none of the counters 226, 228 of the current data structure 224 of the master node 202 are older, then the master node 202 may determine not to update. Alternatively, for example, if the counter 226 of the current data structure 224 is older than the corresponding counter 293 of the message data structure 292 of the message 291, then the master node 202 may investigate, correct inaccuracies (e.g., updating the table 210), update the counter 226 with the counter 293, and process the message 291.

Figure 4:
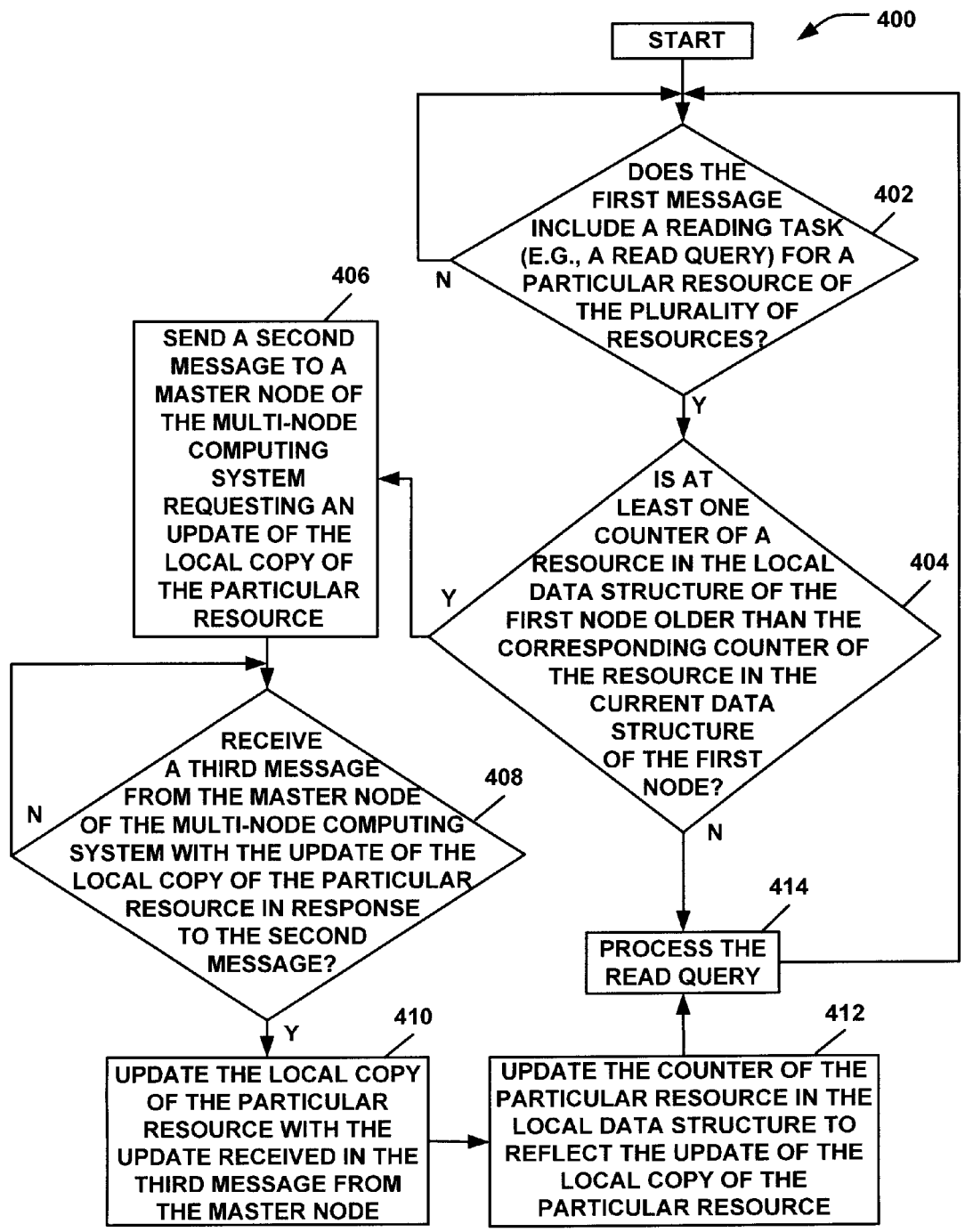
FIG. 4 is a flowchart of an embodiment of a second method of utilizing data structures to synchronize copies of a resource using the apparatus of FIGS. 1-2.

Turning to FIG. 4, the flowchart 400 is an embodiment of a second method of utilizing data structures to synchronize copies of a resource using the apparatus of FIGS. 1-2. In particular, the flowchart 400 may be executed to process a message that includes a reading task for a particular resource (e.g., a read query) using the apparatus of FIGS. 1-2. The flowchart 400 of FIG. 4 may be executed by the member node 232 or the member node 262 of the multi-node computing system 200 of FIG. 2. The flowchart 400 may be executed every time that a received message includes a reading task for a particular resource. FIG. 2 will be referenced throughout the discussion of FIG. 4, and the flowchart 400 of FIG. 4 may be a continuation of FIG. 3.

At 402, the first node of the multi-node computing system may determine whether the first message includes a reading task for a particular resource of the plurality of resources. For example, the member node 232 may determine if the message 291 from the member node 262 includes a read query or any other reading task for a particular resource of the plurality of resources, such as read query that references the first resource (i.e., the table 210).

Control may pass to 404 in response to determining that the first message includes a read query; otherwise, the first node may continue to wait for the read query at 402. Specifically, at 404, the first node may determine whether at least one counter of a resource of the plurality of resources in the local data structure of the first node is older than the corresponding counter of the resource in the current data structure of the first node. If a counter of a resource in the local data structure is older than the corresponding counter of the resource in the current data structure, then the local copy of the resource may be stale and should be synchronized with the master copy of the resource. Depending on the implementation, counters for all resources of the plurality of resources may be compared, or counters for less than all of the resources of the plurality of resources may be compared.

For example, the member node 232 may determine whether at least one counter of a resource of the plurality of resources in the local data structure 248 is older than the corresponding counter of the resource in the current data structure 254. In some embodiments, counters in the local data structure 248 and corresponding counters in the current data structure 254 for all resources (e.g., including the particular resource table 210) may be compared by the member node 232 to determine if any counter in the local data structure 248 is older than the corresponding counter in the current data structure 254, even though the read query of the message 291 is about the particular resource table 210. However, in some embodiments, only the counter 250 in the local data structure 248 and the corresponding counter 256 in the current data structure 254 for the particular resource may be compared to determine if the counter 250 in the local data structure 248 is older.

Specifically, if counters are updated by incrementing, then the counter 250 of the local data structure 248 with a lower value may be older than the corresponding counter 256 of the current data structure 254 with a higher value. Similarly, the counter 252 of the local data structure 248 with a lower value may be older than the corresponding counter 258 of the current data structure 254 with a higher value. In other words, if a counter of the local data structure 248 is less (e.g., <) than the corresponding counter of the current data structure 254, then the counter of the lower data structure 248 may be older. Moreover, if counters include timestamps, then the counter 252 with a timestamp that is older in virtual time may be older than the corresponding counter 258 with a timestamp that is newer in virtual time.

At 406, the first node may send a second message to a master node of the multi-node computing system requesting an update of the local copy of the particular resource in response to determining that the counter of the particular resource in the local data structure is older than the corresponding counter of the particular resource in the current data structure. The second message may include a second message data structure with counters equal to the corresponding counters of the current data structure of the first node. For example, assuming the read query referenced the first resource (i.e., the table 210), the member node 232 may send a second message, such as the message 295, to the master node 202 with a request for an update of its local copy of the table 210 (i.e., update for the table 240). Depending on the implementation, the message 295 may request an update for a local copy of another resource with a counter in the local data structure 248 that is older than the corresponding counter of the current data structure 254. The message 295 sent to the master node 202 may include the message data structure 296 with counters equal to the counters of the current data structure 254 of the member node 232. Of note, counters of the current data structure 254 may have been updated at 306 during the execution of the flowchart 300 of FIG. 3 by the member node 232. The master node 202 may execute the flowchart 300 of FIG. 3 in response to receiving the message 295.

At 408, the first node may receive a third message from the master node of the multi-node computing system with the update of the local copy of the particular resource in response to the second message. The third message may include a third message data structure counters equal to counters of a current data structure of the master node. The counters of the current data structure of the master node may be updated with corresponding counters of a local data structure of the master node. Control may remain 408 until the third message is received by the first node. For example, the member node 232 may receive a third message, such as another message 291, from the master node 202 responding with the update of the local copy of the table 210, that is, the table 240, as well as any other updates for other local copies depending on the implementation. The other message 291 from the master node 202 may include the message data structure 293 with counters equal to the counters of the current data structure 224 of the master node 202. The counters of the current data structure 224 may be updated with corresponding counters of the local data structure 218 of the master node 202. Of note, depending on the implementation, the member node 232 may again execute the flowchart 300 of FIG. 3 in response to receiving the third message, that is, the other message 291.

At 410, the first node may update the local copy of the particular resource with the update received of the third message from the master node. In particular, the first node may update the local copy of the particular resource with multiple updates of a linear progression of updates. For example, the member node 232 may update the table 240 with the update received from the other message 291 from the master node 202, as well as update any other local copy depending on the implementation. Indeed, the table 240 may be updated with multiple updates (e.g., corresponding to multiple processing cycles), such as deferred updates of a linear progression of updates.

At 412, the first node may update the counter of the particular resource in the local data structure to reflect the update of the local copy of the particular resource. For example, the member node 232 may update the counter 250 of the local data structure 248 to reflect the update of the table 240, as well as update any other counter of the local data structure 248 depending on the implementation. Specifically, the counter 250 may be updated with the corresponding counter 256 of the current data structure 254, as the counter 256 should have been updated with the corresponding counter 293 of the other message 291 from the master node 202 per the flowchart 300 of FIG. 3. Alternatively, the counter 250 may simply be updated with the corresponding counter 293 of the other message 291 from the master node 202. At 414, the first node may process the reading task of the first message by reading the updated local copy of the particular resource. For example, the member node 232 may process the read query by reading the table 240, which was updated at 410. Depending on the implementation, other updated local copies may even be read.

Returning to 404, control may pass to 414 if the first node determines at 404 that there is no counter in the local data structure that is older than the corresponding counter of the current data structure. In other words, the local copies on the member node 232 are as new as the master copies on the master node 202 that the member node 262 is aware of. In particular, the first node may process the reading task of the first message from the second node by reading the local copy of the particular resource of the first node in response to determining that the counter of the particular resource in the local data structure is not older than the corresponding counter of the resource in the current data structure. For example, the member node 232 may process the read query by reading the table 240, which has not been updated in this scenario. Lastly, either way, control may pass to 402 to wait for another message with a read query. For example, the member node 232 may wait to receive another message, such as the message 291, with a read query.

Thus, the member node 232 (or the member node 262) may execute the flowchart 400, including comparing its current data structure, which may have been updated by the flowchart 300 of FIG. 3, and its local data structure. Based on what is determined, updates may be requested from the master node 202 and the updates may be performed. As such, stale and out dated local copies may be updated on demand, with fewer handshakes, while maintaining linear sequentiality, and improving performance of read queries.

Of note, steps 410 and 412 of FIG. 4 may illustrate how to process a message with a writing task, such as an update. Therefore, a separate flowchart may be created with the steps 408, 410, 412. For example, if the message 291 received at 302 of FIG. 3 included a writing task, such as an update to the table 240, the member node 232 may execute the flowchart 300 and then execute steps similar to the steps 410 and 412. By doing so, the counter 256, the table 240, and the counter 250 may be updated. Moreover, the table 240 may be updated with multiple processing cycles worth of deferred updates.

Indeed, those of ordinary skill in the art will appreciate that variations may be made to the flowcharts 300, 400. For example, as indicated hereinabove, updates may be requested from a master node for any resource where a counter of a local data structure for a resource is older than a corresponding counter in a current data structure, not just for the particular resource referenced in a read query, a local copy may be updated, and its counter in a local data structure may be updated. Indeed, counters of a local data structure may be compared to counters of current data structure (and possibly compared to counters of a message data structure) in other context, not only in the context of a read query. Moreover, counters of message data structures, current data structures, local data structures, or any combination thereof may be utilized to make decisions regarding synchronization of copies of a resource for practically any kind of message. As yet another example, corresponding counters of a resource (e.g., at 304 of FIG. 3 and at 404 of FIG. 4) may be compared until no more counters are left in the data structures as nodes may have different information about resources. For example, the member node 232 may update the table 240 and the member node 262 may update the table 274. As such, when the member node 262 sends the message 291 to member node 232, then the newer age will be in the counter 294 of the message data structure 292 and the older age may be in the counter 293 of the message data structure 292. As a result, the member node 232 may perform update related operations for its counters and copy of the table 244. However, the member node 232 may not have to perform such update related operations for the table 240 because the member node 232 already has as new as or newer information.

Figure 5:
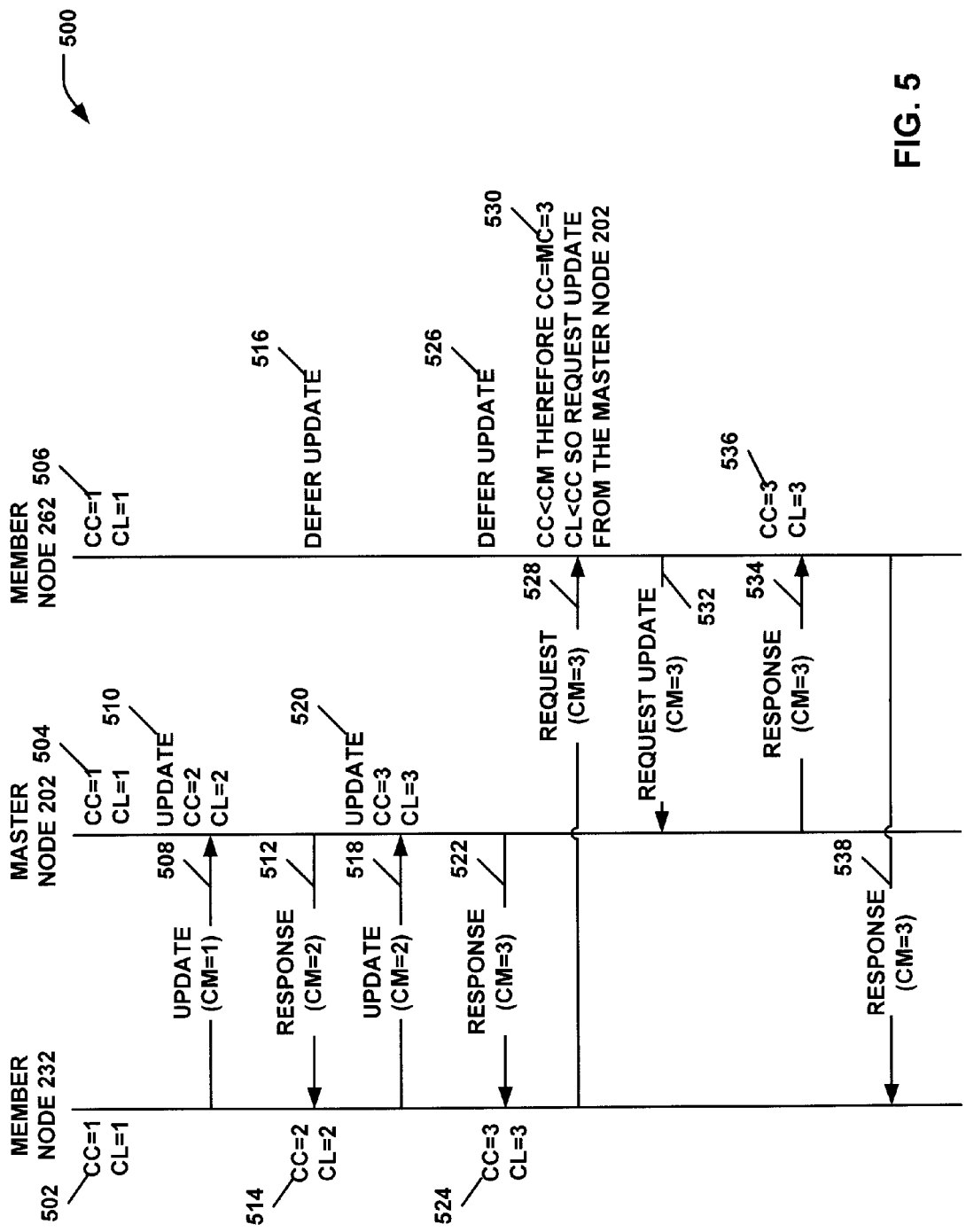
FIG. 5 is an example of utilizing data structures to synchronize copies of a resource using the apparatus of FIGS. 1-2.

Turning to FIG. 5, FIG. 5 is an example 500 of utilizing data structures to synchronize copies of a resource using the apparatus of FIGS. 1-2. For example, the current data structure 254 may start out with the counter 256 having a value 1 for the table 240 (i.e., the local copy of the first resource) and the counter 258 having a value of 1 for the table 244. Similarly, the master node 202 and the member node 262 may start out with similar values in the counters of their current data structures 224, 284 and local structures 218, 278. For simplicity, the flowchart 500 will illustrate the changes to counters associated with the first resource. CC is shorthand for counter of current data structure, CL is shorthand for counter of local data structure, and CM is shorthand for counter of message data structure.

Turning to 502, 504, 506, each of the member node 232, the master node 202, and the member node 262 may start out with their counters 256, 250, 226, 220, 286, 280, respectively, equal to 1. Each of the member node 232, the master node 202, and the member node 262 may also include a copy of the first resource, that is, the table 240, the table 210, the table 270, respectively. Thus, copies of the first resource and counters may be start out synchronized.

Next, at 508, the member node 232 may want to update the table 210 on master node 202 and sends an update message to the master node 202. Embedded within the update message is CM equal to 1 because the member node 232's CC is equal to 1. The master node 202 receives the update message, and in response to the update message, at 510, the master node 202 updates the table 210, the CL is updated to 2 because the table 210 was updated, and the CC is updated to 2 because CL was updated to 2.

At 512, the master node 202 sends a response to the member node 232. Embedded within the response is CM equal to 2 because the master node 202's CC is equal to 2. At 514, the member node 232's CC equals 1, which is older than the CM equal to 2, therefore, the member node 232 updates the CC to equal 2. At 514, the response also includes an update to the table 240, thus, the member node 232 updates the table 240 and updates the CL to 2. Of note, under the member node 262, at 516, the terminology "DEFER UPDATE" indicates that the update was deferred because the master node 202 sent the update to the member node 232 but not to the member node 262.

Next, at 518, the member node 232 may want to once again update the table 210 on master node 202 and sends another update message to the master node 202. Embedded within the other update message is CM equal to 2 because the member node 232's CC is equal to 2. The master node 202 receives the other update message, and in response to the other update message, at 520, the master node 202 updates the table 210, the CL is updated to 3 because the table 210 was updated, and the CC is updated to 3 because CL was updated to 3.

At 522, the master node 202 sends a response to the member node 232. Embedded within the response is CM equal to 3 because the master node 202's CC is equal to 3. At 524, the member node 232's CC equals 2, which is older than the CM equal to 3, therefore, the member node 232 updates the CC to equal 3. At 524, the response also includes an update to the table 240, thus, the member node 232 updates the table 240 and updates the CL to 3. Of note, under the member node 262, at 526, the update was deferred on the member node 262.

At 528, the member node 232 sends a request with a reading task, such as a read query for the first resource, to the member node 262. Embedded within the request is CM equal to 3 because the member node 232's CC is equal to 3. At 530, the member node 262's CC equals 1 because the two previous updates were deferred. CC equal to 1 is older than the CM equal to 3, therefore, the member node 262 updates the CC to equal 3. Moreover, the CL equal to 1 is older than CC equal to 3, and as a result, at 532, the member node 262 sends a request to the master node 202 requesting an update of table 270. Embedded within the request is CM equal to 3 because the member node 262's CC is equal to 3. The member node 262 may also request an update of any other local copy with a CL older than its corresponding CC. At 534, the master node 202 may send a response to the member node 262 with the requested update. Embedded within the response is CM equal to 3 because the master node 202's CC is equal to 3. At 536, the member node 262's CC equals 3, which is not older than the CM equal to 3, therefore, the member node 262 does not need to update the CC. If the CM of the response is newer than 3, for example, if CM equal to 5 because additional updates to the table 210 have occurred on the master node 202 since the request of 528, then the CC may be updated accordingly. Nonetheless, the response also includes an update to the table 270, thus, the member node 262 updates the table 270 to synchronize it with the master copy (i.e., the table 210) and updates its CL to 3. For example, CL is updated to a value of 3 from the CM of the response of 534 or from the CC that should also be at 3 at 536. Lastly, the member node 262 processes the read query by reading the updated table 270, and sends a response to the member node 232 (at 538). Embedded within the response is CM equal to 3 because the member node 262's CC is equal to 3.

Thus, those of ordinary skill in the art will appreciate that two updates were deferred at 516, 526, and the local copy of the first resource (i.e., the table 270) of the member node 262 was updated with multiple processing cycles at 536 in response to the on-demand request from the member node 262. Indeed, the master node 202 did not have to flush all updates to all nodes and waste computing resources flushing updates to all nodes to maintain synchronization. Furthermore, information about the master copy of the first resource (i.e., the table 210) was embedded within the various messages that were sent and learned by nodes receiving the messages without extra handshakes with the master node 202. Indeed, the higher the number of nodes, the more updates and/or handshakes may potentially be deferred. Moreover, sequentiality may be enforced. For example, it may appear to nodes that updates are happening in sequential order even though updates may be deferred.

Figure 6:
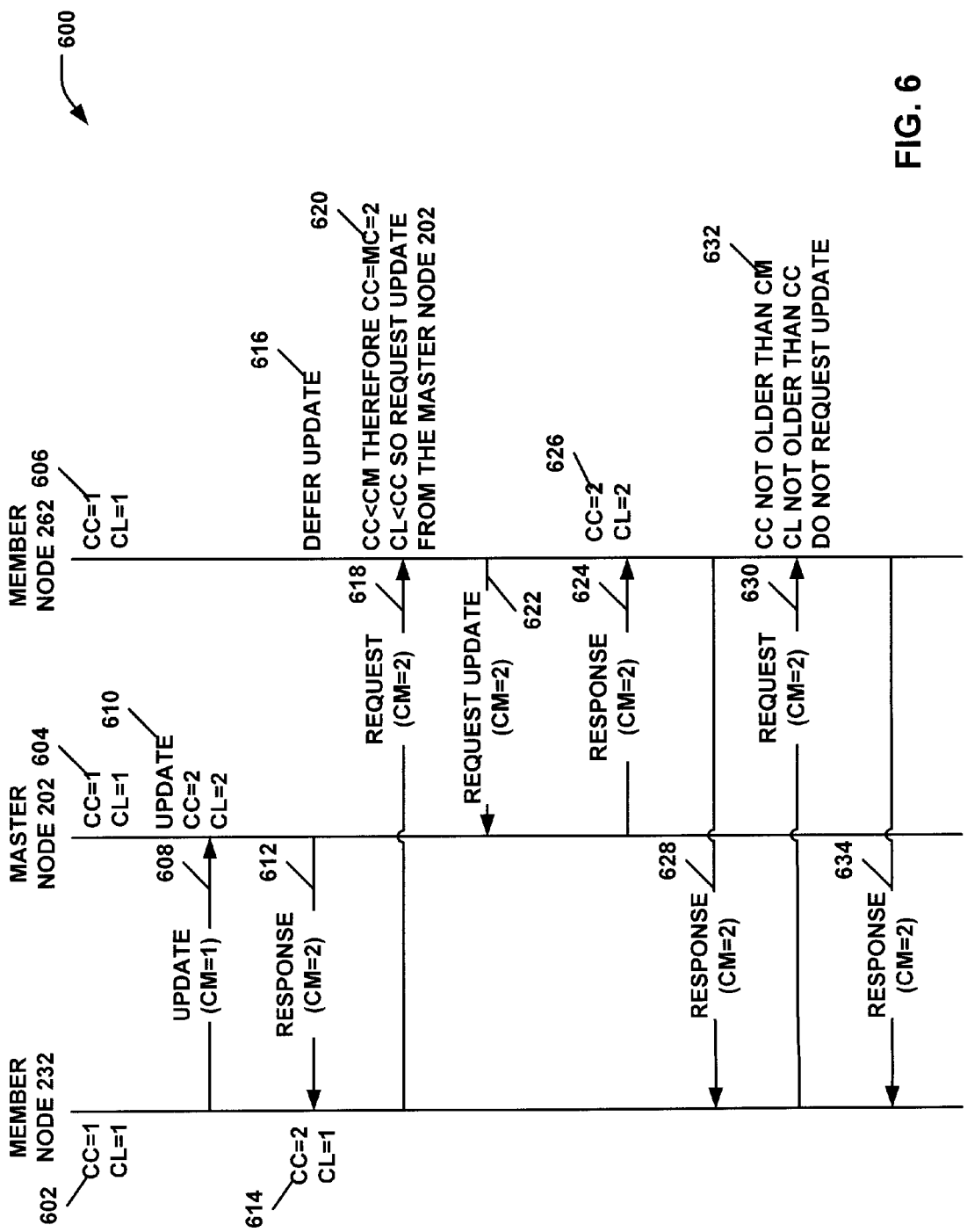
FIG. 6 is a second example of utilizing data structures to synchronize copies of a resource using the apparatus of FIGS. 1-2.

Turning to FIG. 6, FIG. 6 is another example 600 of utilizing data structures to synchronize copies of a resource using the apparatus of FIGS. 1-2. Turning to 602, 604, 606, each of the member node 232, the master node 202, and the member node 262 may start out with their counters 256, 250, 226, 220, 286, 280, respectively, equal to 1. Each of the member node 232, the master node 202, and the member node 262 may also include a copy of the first resource, that is, the table 240, the table 210, the table 270, respectively. Thus, copies of the first resource, and counters, may be start out synchronized.

Next, at 608, the member node 232 may want to update the table 210 on master node 202 and sends an update message to the master node 202. Embedded within the update message is CM equal to 1 because the member node 232's CC is equal to 1. The master node 202 receives the update message, and in response to the update message, at 610, the master node 202 updates the table 210, the CL is updated to 2 because the table 210 was updated, and the CC is updated to 2 because CL was updated to 2.

At 612, the master node 202 sends a response to the member node 232. Embedded within the response is CM equal to 2 because the master node 202's CC is equal to 2. At 614, the member node 232's CC equals 1, which is older than the CM equal to 2, therefore, the member node 232 updates the CC to equal 2. The response may simply be an acknowledgement that confirming that the master node 202 updated the table 210. At 614, this response did not include an update to the table 240, thus, the member node 232 does not update the table 240 and does not update the CL (i.e., CL remains at 1). Of note, under the member node 262, at 616, the update was deferred on the member node 262.

At 618, the member node 232 sends a request with a reading task, such as a read query for the first resource, to the member node 262. Embedded within the request is CM equal to 2 because the member node 232's CC is equal to 2. At 620, the member node 262's CC equals 1 because the previous update was deferred, which is older than the CM equal to 2, therefore, the member node 262 updates the CC to equal 2. Moreover, the CL equal to 1 is older than CC equal to 2, and as a result, at 622, the member node 262 sends a request to the master node 202 requesting an update of table 270. Embedded within the request is CM equal to 2 because the member node 262's CC is equal to 2. The member node 262 may also request an update of any other local copy with a CL older than its corresponding CC. At 624, the master node 202 may send a response to the member node 262 with the requested update. Embedded within the response is CM equal to 2 because the master node 202's CC is equal to 2. At 626, the member node 262's CC equals 2, which is not older than the CM equal to 2, therefore, the member node 262 does not need to update the CC. If the CM of the response is newer than 2, for example, if CM equal to 5 because additional updates to the table 210 have occurred on the master node 202 since the request of 618, then the CC may be updated accordingly. Nonetheless, the response also includes an update to the table 270, thus, the member node 262 updates the table 270 to synchronize it with the master copy (i.e., the table 210) and updates its CL to 2. The member node 262 processes the read query by reading the updated table 270, and sends a response to the member node 232 (at 628). Embedded within the response is CM equal to 2 because the member node 262's CC is equal to 2.

At 630, the member node 232 sends another request with a reading task, such as a read query for the first resource, to the member node 262. Embedded within the request is CM equal to 2 because the member node 232's CC is still equal to 2. At 632, the member node 262's CC equals 2, which is not older than the CM equal to 2, therefore, the member node 262 does not update the CC. Moreover, the CL is equal to 2, which is not older than CC equal to 2, and as a result, processes the read query by reading the table 270 without requesting an update from the master node 202 or even communicating with the master node 202. At 634, the member node 262 sends a response to the member node 232. Embedded within the response is CM equal to 2 because the member node 262's CC is equal to 2.

Thus, those of ordinary skill in the art will appreciate that one update was deferred at 616, and the local copy of the first resource (i.e., the table 270) of the member node 262 was updated at 626 because of an on demand request from the member node 262. Furthermore, information about the master copy of the first resource (i.e., the table 210) was embedded within various messages that were sent and learned by nodes receiving the messages without extra handshakes with the master node 202. Indeed, as described herein, nodes would be able to update counters of their current data structure based on messages with other nodes, but without communicating with a master node.

Additionally, as illustrated by 630, 632, 634, as long as two member nodes are sufficiently updated to process a message, the two member nodes may not have to communicate with a master node. Moreover, it may be possible for the master node to have an even newer master copy than the two member nodes are aware of, however, updates may still be deferred and handshakes reduced as long as the two member nodes are logically consistent and sufficiently updated. As an example, a message data structure embedded in a message received by a node of the multi-node computing system may provide information regarding ages of master copies known by the node sending the message at the time that the message was sent. However, it may be possible that one or more master copies at the master node have been updated since the message was sent. For example, at 630, the table 210 may have been updated by the master node 202 in response to a request from a third member node (not shown) of the multi-node computing system 200. Therefore, the table 210 may have an age that is even newer than what is known by the member node 232 and the member node 262, but the member node 262 may not have to synchronize with the update from the third member node. Instead, the member node 262 may still be able to process the read query from the member node 232 (at 630, 632, and 634) because the table 270 is as new as or newer than what the member node 232 is aware of. Thus, sequential consistency is still maintained between the member nodes 232, 262.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Thus, the present disclosure is not intended to be limited to the embodiments shown herein but is to be accorded the widest scope possible consistent with the principles and features as defined by the following claims.

The invention claimed is:

1. A method of utilizing data structures to synchronize copies of a resource, the method comprising:
    receiving, at a first node of a multi-node computing system, a first message including a first message data structure from a second node of the multi-node computing system, wherein the first message is unsolicited by the first node, wherein the first node stores a data structure including a first counter for a resource, the first counter indicative of a first age of a master copy of the resource, and wherein the first message data structure includes a second counter for the resource, the second counter indicative of a second age of the master copy of the resource;
    determining, at the first node, that the first age of the master copy of the resource indicated by the first counter stored at the first node is older than the second age of the master copy of the resource indicated by the second counter included in the first message from the second node;
    updating, at the first node, the first counter to indicate the second age associated with the second counter included in the first message; and
    in response to a determination by the first node that a third age indicated by a third counter is older than the second age indicated by the updated first counter, sending, by the first node a second message associated with a request for an update of the resource to a third node of the multi-node computing system, wherein the third node is different than the second node.

2. The method of claim 1, further comprising:
determining, at the first node, that the third age of a local copy of the resource indicated by the third counter included in a local data structure stored at the first node is older than the second age of the master copy of the resource indicated by the updated first counter stored at the first node;
receiving, at the first node, a third message from the third node, wherein the third message includes the requested update;
updating, at the first node, the local copy of the resource based on the third message; and
updating, at the first node, the third counter to reflect the update of the local copy of the resource.

3. The method of claim 2, further comprising receiving a fourth message associated with a reading task.

4. The method of claim 3, further comprising processing the reading task, by the first node, by reading the updated local copy of the resource.

5. The method of claim 2, wherein updating, at the first node, the local copy of the resource includes updating the local copy of the resource based on a linear progression of updates.

6. The method of claim 1, wherein the first message includes an update for a second resource, further comprising:
updating, at the first node, a local copy of the second resource with the update received in the first message from the second node; and
updating, at the first node, a fourth counter that is associated with the local copy of the second resource and that is included in a local data structure stored at the first node to reflect the update of the local copy of the second resource.

7. The method of claim 6, wherein the first node is a master node of the multi-node computing system, and wherein the local copy of the resource is the master copy of the resource.

8. The method of claim 6, wherein the first node is a member node of the multi-node computing system.

9. The method of claim 1, further comprising processing, at the first node, the first message, wherein the first message comprises an acknowledgement message.

10. The method of claim 1, further comprising, receiving, at the first node, a third message from the third node of the multi-node computing system, wherein the third message includes the requested update.

11. The method of claim 1, wherein the third node is a member node of the multi-node computing system.

12. The method of claim 1, wherein the third node is a master node of the multi-node computing system.

13. The method of claim 1, wherein the second message is sent in response to a determination that the third age of a local copy of the resource indicated by the third counter included in a local data structure stored at the first node is older than the second age of the updated first counter.

14. An apparatus comprising:
a memory storing program code; and
a processor configured to access the memory and execute the program code to:
receive, at a first node of a multi-node computing system, a first message including a first message data structure included in a header of the first message, from a second node of the multi-node computing system, wherein the first message is unsolicited by the first node, wherein the first node stores a data structure including a first counter for a resource, the first counter indicative of a first age of a master copy of the resource, and wherein the first message data structure includes a second counter for the resource, the second counter indicative of a second age of the master copy of the resource;
determine, at the first node, that the first age of the master copy of the resource indicated by the first counter stored at the first node is older than the second age of the master copy of the resource indicated by the second counter included in the first message from the second node; and
update, at the first node, the first age indicated by the first counter with the second age indicated by the second counter included in the first message from the second node.

15. The apparatus of claim 14, wherein the processor is configured to execute the program code to determine, at the first node, that a third age of a local copy of the resource indicated by a third counter included in a local data structure stored at the first node is older than the second age of the master copy of the resource indicated by the updated first counter stored at the first node.

16. The apparatus of claim 15, wherein the processor is configured to execute the program code to send, by the first node, a second message to a master node of the multi-node computing system requesting an update of the local copy of the resource.

17. The apparatus of claim 14, wherein each message received at the first node from the second node includes a message data structure, each message data structure including a counter associated with an age of the master copy of the resource.

18. The apparatus of claim 14, further comprising:
determine, at the first node, to update a local copy of the resource in response to a determination that a third age of a local copy of the resource indicated by a third counter included in a local data structure stored at the first node is older than the second age of the master copy of the resource indicated by the updated first counter stored at the first node; and
defer, at the first node, updating the local copy of the resource until the first receives a read request from another node.

19. A program product, comprising:
program code to:
receive, at a first node of a multi-node computing system, a first message including a first message data structure from a second node of the multi-node computing system, wherein the first message is unsolicited by the first node, wherein the first node stores a data structure including a first counter for a resource, the first counter indicative of a first age of a master copy of the resource, and wherein the first message data structure includes a second counter for the resource, the second counter indicative of a second age of the master copy of the resource;
determine, at the first node, that the first age of the master copy of the resource indicated by the first counter stored at the first node is older than the second age of the master copy of the resource indicated by the second counter included in the first message from the second node;
update, at the first node, the first age indicated by the first counter with the second age indicated by the second counter included in the first message from the second node; and
after updating the first age indicated by the first counter with the second age, initiating an update of a local copy of the resource of the first node in response to a read request received at the first node from another node; and a computer readable storage device bearing the program code.

20. The program product of claim 19, further comprising:

prior to receiving the read request, determine to update the local copy of the resource based on the second age of the updated first counter; and defer updating the local copy of the resource, wherein updating the local copy of the resource is deferred until the read request is received, wherein the other node is the second node.

* * * * *